United States Patent [19]

Weber

[11] Patent Number: 6,097,775

[45] Date of Patent: Aug. 1, 2000

[54] METHOD AND APPARATUS FOR SYNCHRONOUSLY TRANSFERRING SIGNALS BETWEEN CLOCK DOMAINS

[75] Inventor: David M. Weber, Monument, Colo.

[73] Assignee: LSI Logic Corporation, Milpitas, Calif.

[21] Appl. No.: 09/024,919

[22] Filed: Feb. 17, 1998

[51] Int. Cl.[7] .............................. H04L 7/00; H04L 13/10; G06F 9/445

[52] U.S. Cl. .......................... 375/354; 710/61; 713/400; 370/304

[58] Field of Search .................................. 375/354, 355, 375/375, 356, 357; 710/25, 61, 58, 20; 327/141, 144, 155, 176; 329/93; 713/400, 502, 600, 500; 370/304, 350

[56] References Cited

U.S. PATENT DOCUMENTS

| | | | |
|---|---|---|---|
| 4,700,346 | 10/1987 | Chandran et al. | 371/1 |
| 4,873,703 | 10/1989 | Crandall et al. | 375/118 |
| 5,224,213 | 6/1993 | Dieffenderfer et al. | 395/250 |
| 5,256,912 | 10/1993 | Rios | 307/269 |
| 5,291,529 | 3/1994 | Crook et al. | 375/109 |
| 5,315,181 | 5/1994 | Schowe | 307/480 |
| 5,369,672 | 11/1994 | Matsumoto | 375/106 |
| 5,487,092 | 1/1996 | Finney et al. | 375/354 |
| 5,548,620 | 8/1996 | Rogers | 375/354 |
| 5,649,176 | 7/1997 | Selvidge et al. | 713/400 |
| 5,652,848 | 7/1997 | Bui et al. | 395/309 |
| 5,654,988 | 8/1997 | Heyward et al. | 375/335 |

*Primary Examiner*—Chi H. Pham
*Assistant Examiner*—Khai Tran

[57] ABSTRACT

A method and apparatus of a synchronizer circuit for transferring signals between two clock domains in which a first synchronizer unit and a second synchronizer unit form a hand-shaking protocol. In particular, an input event from a source clock domain is captured in an input unit and a first signal is asserted indicating that the input signal is to be transferred to a target clock domain. This first signal is synchronized to the clock signal in the target clock domain at the first synchronizer unit, causing assertion of a second signal. The second signal is coupled to an output unit which generates an output event signal for a single clock period.

31 Claims, 3 Drawing Sheets

METHOD AND APPARATUS FOR SYNCHRONOUSLY TRANSFERRING SIGNALS BETWEEN CLOCK DOMAINS

BACKGROUND OF THE INVENTION

1. Technical Field

The present invention relates generally to an improved data processing system and in particular to a transfer of data within a data processing system. Still more particularly, the present invention relates to a method and apparatus for transferring signal pulses between clock domains within a data processing system.

2. Description of the Related Art

Computer technology is continuously advancing, resulting in modern computer systems which provide ever increasing performance. As computer systems become more advanced, more and more components are being added to computer systems and the number of transistors within these components is ever increasing.

One artifact of increasing computer system components and transistors is the generation of multiple clock signals. Different components within the computer system are typically driven by (also referred to as "referenced to") clock signals having different frequencies. Components which are driven by a particular clock signal are referred to as operating in the clock domain of that particular clock signal.

In addition, different functional blocks within the components may also be driven by clock signals having different frequencies. For example, a computer system may include a processor coupled to a bus and an interrupt controller, where the interrupt controller generates signals on a serial bus which is referenced to a first clock signal, the bus is referenced to a second clock signal, and the processor core is referenced to yet a third clock signal. Synchronizers are typically used in computer systems to allow different components operating in different clock domains to communicate with one another. When a component operating in a first clock domain sends a signal to a component in a second clock domain, the signal is sent through a synchronizer so that the timing of the signal is synchronized to the second clock domain.

Presently available synchronizers typically use an edge detection technique that relies on an asynchronous feedback path to clear the edge detection. An example of such a circuit is found in FIG. 1 in which synchronizer circuit 100 includes an input unit 102 and a synchronizer unit 104 in which an input signal from the first clock domain is received at input 106 and input unit 102. This input signal is sent to synchronizer unit 104 which sends data out into the second clock domain at output 108. The synchronization to the data to the second clock domain is controlled by a destination clock signal applied to input 110. The asynchronous feedback path is formed by the connection from output 108 and synchronizer unit 104 to the connection at input 112 and input 102. This circuit has a disadvantage of not being compatible with newer synchronous design requirements that require support of scan testing and static timing. Therefore, it would be advantageous to have an improved method and apparatus for synchronizing signals for transmission between clock domains.

SUMMARY OF THE INVENTION

The present invention provides a synchronizer circuit for transferring signals between two clock domains in which a first synchronizer unit and a second synchronizer unit form a hand-shaking protocol. In particular, an input event from a source clock domain is captured in an input unit and a first signal is asserted indicating that the input signal is to be transferred to a target clock domain. This first signal is synchronized to the clock signal in the target clock domain at the first synchronizer unit, causing assertion of a second signal. The second signal is coupled to an output unit which generates an output event signal for a single clock period.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
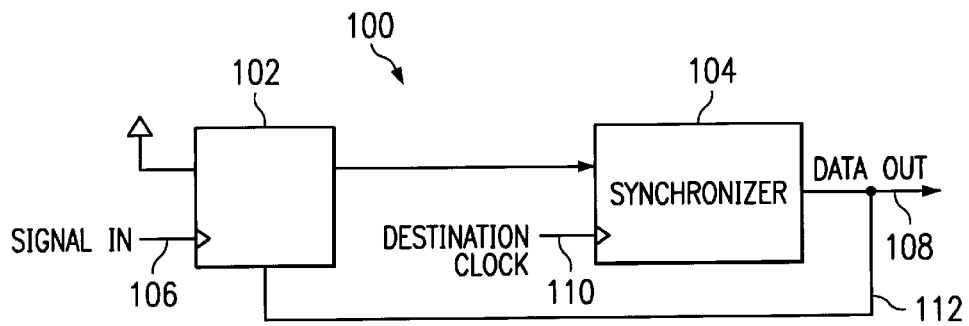
FIG. 1 in which synchronized zero circuit includes an input unit and a synchronizer unit in which an input signal from the first clock domain is received at input and input unit.
Figure 2:
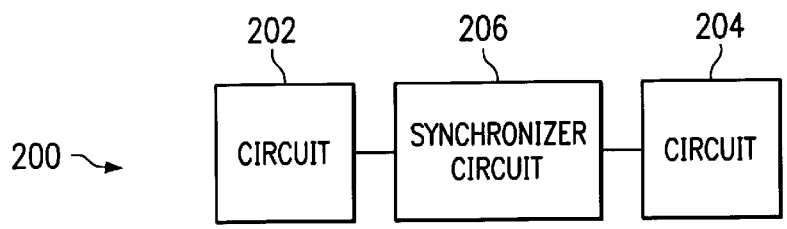
FIG. 2 is a data processing system in which a preferred embodiment of the present invention may be implemented.

With reference now to figures and in particular with reference to FIG. 2, a data processing system is illustrated in which a preferred embodiment of the present invention may be implemented. Data processing system 200 includes a circuit 202 and circuit 204 in which circuit 202 is operating in a different clock domain from circuit 204. Signal pulses from circuit 202 to circuit 204 are synchronized using synchronizer circuit 206. In the depicted example, data processing system 200 may be a computer with circuit 202 and circuit 204 being circuits operating within the computer. For example, circuit 202 may be a processor with circuit 204 being a bus in which circuit 202 operates using a first clock signal while circuit 204 operates while using a second clock signal. In another portion of data processing system 200, circuit 202 could be an interrupt controller generating signals using one clock signal while circuit 204 is a serial bus, which is referenced to another clock signal. Synchronizer circuit 206 is associated with circuit 202 in the depicted example. Alternatively, synchronizer circuit 206 may be contained within circuit 202.

Figure 3:
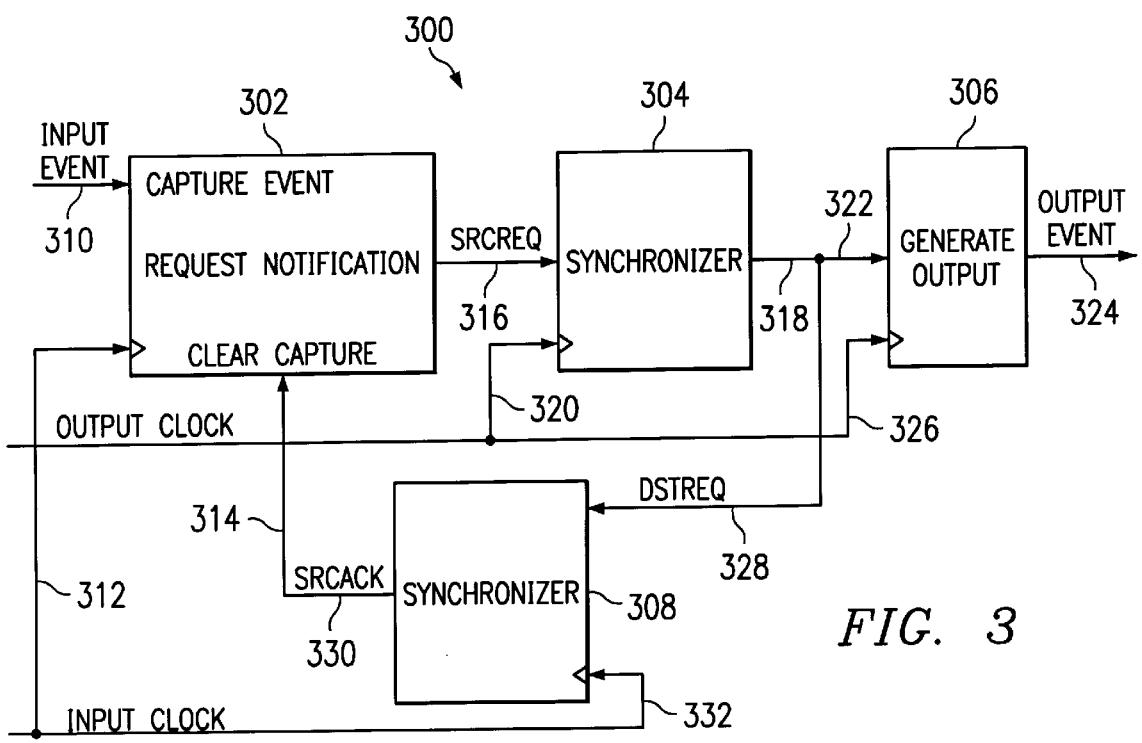
FIG. 3 is a block diagram of a synchronizer circuit in accordance with a preferred embodiment of the present invention.

With reference now to FIG. 3, a block diagram of a synchronizer circuit is depicted in accordance with a preferred embodiment of the present invention. Synchronizer circuit 300, in the depicted example, includes input unit 302, a synchronizer unit 304, an output unit 306, and a synchronizer unit 308. Input unit 302 is configured to receive an input event signal at capture event input 310. An input event signal may be, for example, a signal pulse, which may last only a single clock cycle. The input event occurs in a source clock domain. Input unit 302 also includes an input 312 that is adapted for connection to an input clock signal, which is the clock signal for the source clock domain, originating the input event signal. Input unit 302 also includes a clear capture input 314, which is employed to clear the input event signal captured by input unit 302. In response to detecting and capturing a signal indicating an event, input unit 302 generates a signal SRCREQ at output 316 to transmit the signal indicating the event.

Synchronizer unit 304 receives signal SRCREQ from input unit 302 at input 316. This signal is sent to output 318 in response to a clock signal at input 320. Output 318 in synchronizer unit 304 is connected to input 322 in output unit 306. This output unit generates an output event signal at output 324 in response to a clock signal from an output clock at input 326. The output clock is the clock for the target clock domain. Synchronizer unit 308 has an input 328, which receives signal DSTREQ from output 318 in synchronizer unit 304. In turn, synchronizer unit 308 generates a signal SRCACK at output 330 in response to a clock signal from the input clock at input 332.

In operation, an input event occurs in the source clock domain and the input event is captured by input unit 302. This capturing of the input event allows for the input event to remain on or disappear and still be treated as a single input event. Input unit 302 then generates signal SRCREQ, indicating that an event needs to be transferred to the target clock domain. Signal SRCREQ is synchronized to the output clock by synchronizer unit 304 and causes the generation of signal DSTREQ by synchronizer unit 304. The assertion of signal DSTREQ causes a single clock wide assertion of an output event signal by output unit 306. In the depicted example, output unit 306 generates an output event signal that lasts only for a single clock pulse because signal DSTREQ may stay on for numerous cycles, depending on the source clock domain and target clock domain relationships.

Signal DSTTEQ is synchronized back to the source clock domain through synchronizer unit 308, causing the assertion of signal SRCACK, which causes a deassertion of SRCEQ. The deassertion of signal SRCREQ by input unit 302 causes the subsequent deassertion of signal DSTREQ by synchronizer unit 304 and signal SRCACK by synchronizer unit 308. Another event indicated by an input event signal may be recognized and transferred by synchronizer circuit 300 as soon as the deassertion of SRCACK is detected by synchronizer unit 308.

Figure 4:
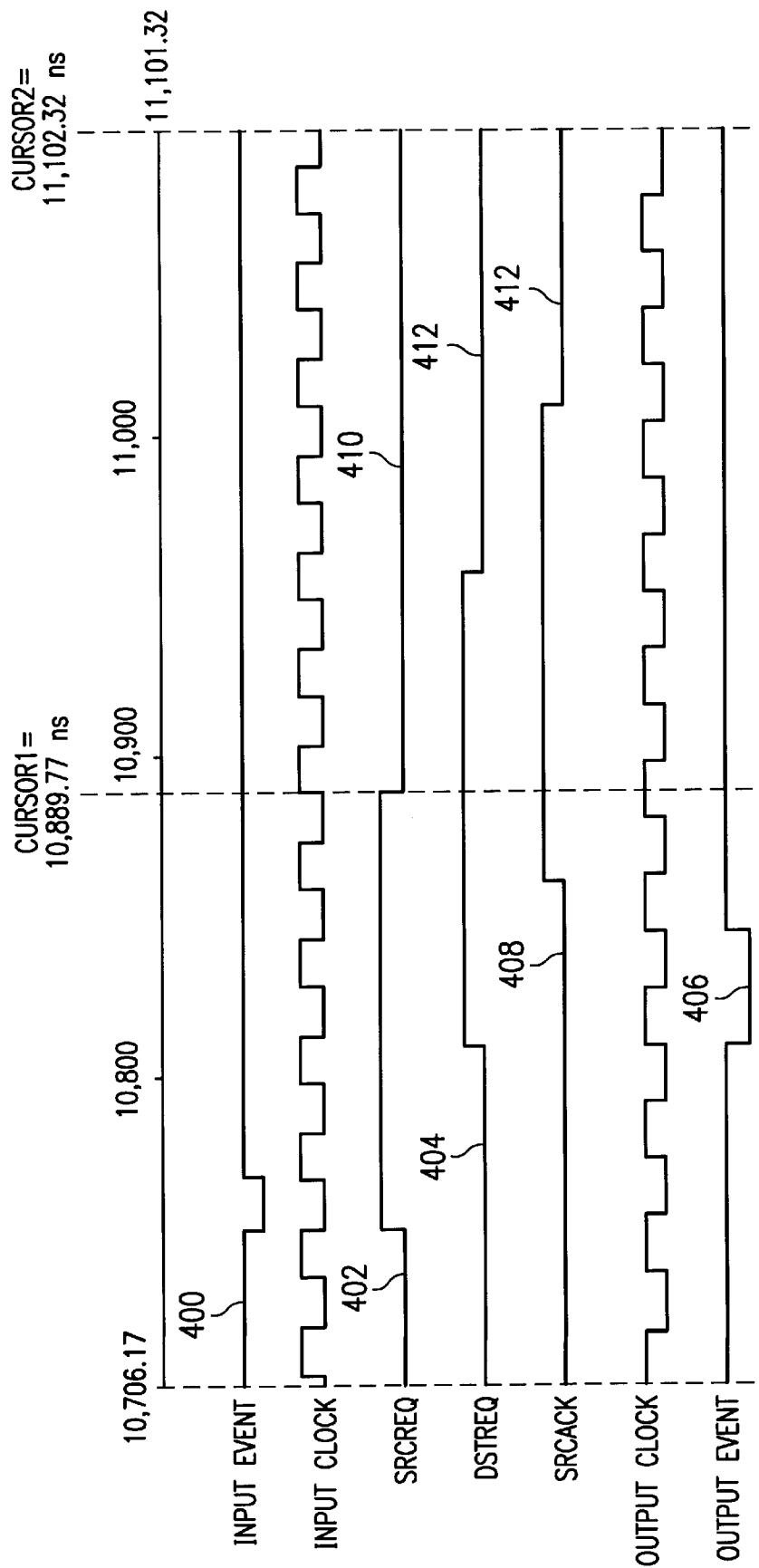
FIG. 4 is a timing diagram of signals generated during the operation of the synchronizer circuit in accordance with a preferred embodiment of the present invention.

With reference now to FIG. 4, a timing diagram of signals generated during the operation of the synchronizer circuit in FIG. 3 is depicted in accordance with a preferred embodiment of the present invention. In the depicted example, an input event begins at point 400 in the input event signal. This input event signal is captured by input unit 302, resulting in the assertion of signal SRCREQ at point 402 in signal SRCREQ. Assertion of signal of SRCREQ results in synchronizer unit 304 asserting signal DSTREQ at point 404 as indicated in signal DSTREQ in FIG. 4. This assertion of DSTREQ results in an output event occurring in the output event signal beginning at point 406, which lasts for a single clock period as illustrated in the output event signal in FIG. 4. Signal SRCACK in FIG. 4 is asserted at point 408 by synchronized unit 308 in FIG. 3.

The assertion of signal SRCACK by synchronizer unit 308 causes the deassertion of signal SRCREQ at point 410 in signal SRCREQ. Subsequently, signal DSTREQ is deasserted by input unit 302 and signal SRCACK is deasserted by synchronizer unit 308.

As can be seen from FIGS. 3 and 4, the synchronizer circuit of the present invention includes two different clock frequencies that interact in different places. The synchronizer circuit depicted in FIG. 3 employs synchronized handshaking of a pair of signals, SRCREQ and SCRACK, to transfer signals from one clock domain to another clock domain. Additionally, although not shown, synchronizer circuit 300 may be configured to select the signal plurality of input event signals and output event signals.

Figure 5:
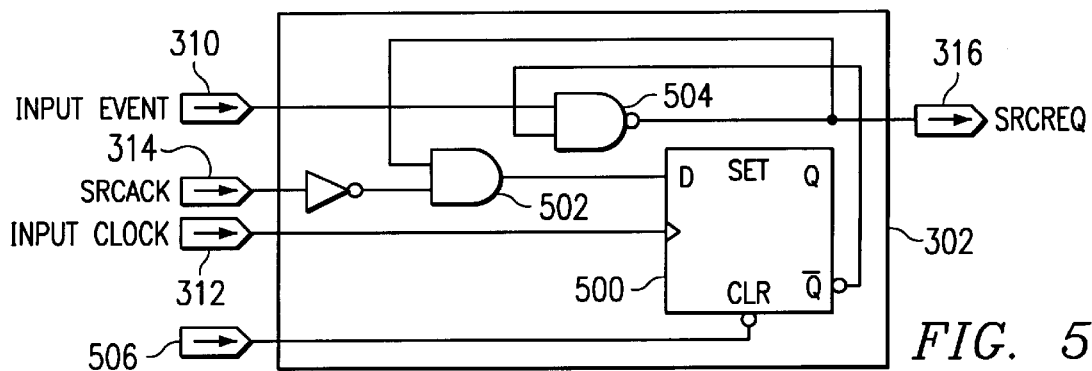
FIG. 5 is a logic diagram of the input unit in accordance with a preferred embodiment of the present invention.

With reference now to FIG. 5, a logic diagram of the input unit 302 from FIG. 3 is depicted in accordance with a preferred embodiment of the present invention. In the depicted examples, reference numerals are reused to indicate like elements in the drawings. Input unit 302 includes a D flip-flop 500, an AND gate 502, and a NAND gate 504. D flip-flop 500 receives the input clock signals and generates an output signal that is connected to NAND gate 504. NAND gate 504 also receives an input event signal from input 310 to generate signal SRCREQ at output 316. AND gate 502 receives signal SRCACK at input 314 along with the output from NAND gate 504 to generate an output that is connected to the input to D flip-flop 500. When the input event signal goes low at input 310, the output of NAND gate 504 immediately goes to a high state. The signal is then transferred through AND gate 502 to D flip-flop 500, which then goes low and remains low until the SRCACK signal goes high. Additionally, AND gate 502 goes to a high state. When signal SRCACK at input 314 goes high, the output of AND gate 502 is forced into a low state returning output 316 to an initial state with signal SRCREQ being deasserted. Input 506 is an input for a global reset signal used to initialize a circuit to an idle state at power up.

Figure 6A:
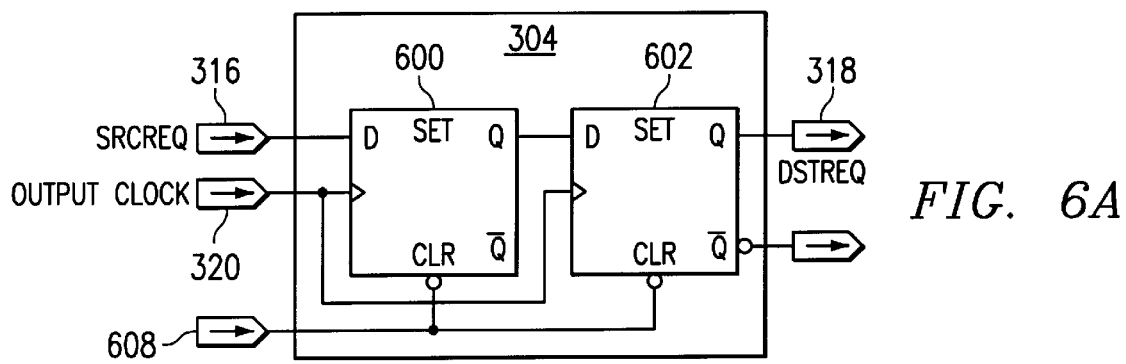
FIG. 6A and FIG. 6B are logic diagrams of synchronizer units respectively.
Figure 6B:
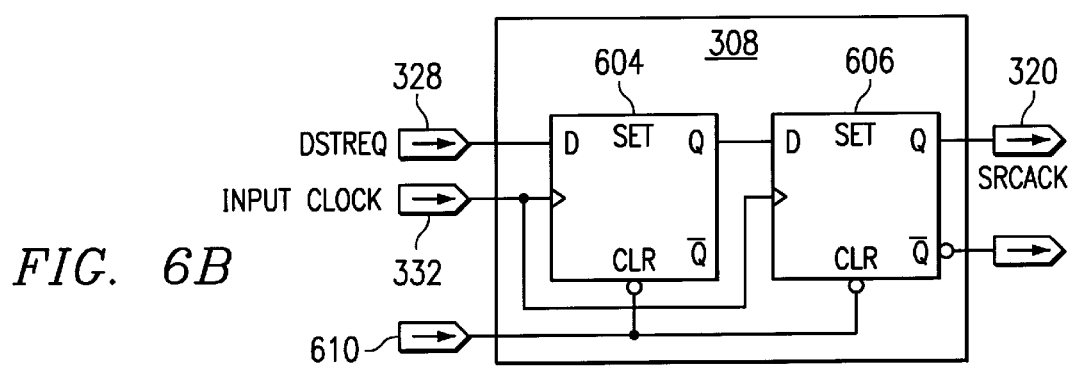

With reference now to FIG. 6A and FIG. 6B, logic diagrams of synchronizer units 304 and 308 are illustrated, respectively. Synchronizer unit 304 in FIG. 6A is formed by D flip-flops 600 and 602 while synchronizer unit 308 in FIG. 6B is formed by D flip-flops 604 and 606. Inputs 608 and 610 are inputs for a global reset signal used to initialize the circuits in FIGS. 6A and 6B to an idle state at power up.

Figure 7:
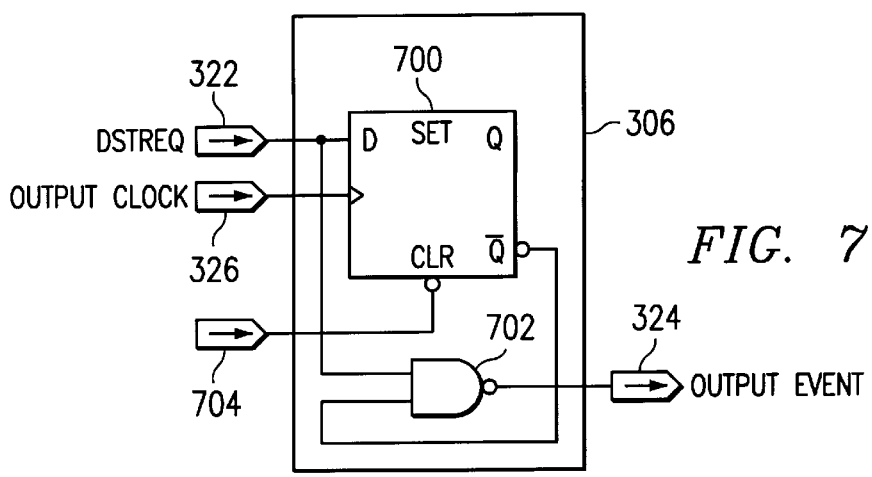
FIG. 7 is a logic diagram of an output unit in accordance with a preferred embodiment of the present invention.

With reference now to FIG. 7, a logic diagram of an output unit 306 is depicted in accordance with a preferred embodiment of the present invention. Output unit 306 in the depicted example contains a D flip-flop 700 and a NAND gate 702. The output of NAND gate 702 is connected to output 324 and output unit 306. The not Q output of the D flip-flop 700 is connected to the input of NAND gate 702. Additionally, NAND gate 702 receives signal DSTREQ from input 322 as an input in generating the output event signal at output 324. The output clock signal is used to drive D flip-flop 700 through the application of the output clock signal at input 326 in output unit 306. Input 704 is an input for a global reset signal used to initialize a circuit to an idle state at power up.

Thus, the present invention provides an improved method and apparatus for transferring a signal pulse between two clock domains. The present invention allows for the transfer of signals representing events that may be only a single source clock period wide. The present invention provides this advantage by employing two synchronizer units to form a hand-shaking protocol as described above. The present invention implies fully synchronous design techniques to facilitate tools requiring these techniques. Additionally, the present invention avoids susceptibility of noise and glitches being caught on the input signal. Additionally, the present invention does not require a self-timed feedback path.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. An apparatus for transferring an input event from a source clock domain to a target clock domain, the apparatus comprising:

an input unit having a first input, a second input, a third input, and an output, wherein the first input is configured to receive the input event, the second input is configured to receive a source clock signal from the source clock domain, the third input is configured to receive a clear signal, and the output generates a first intermediate signal, the first intermediate signal being present at the output until the clear signal is received at the third input;

a first synchronizer unit having a first input, a second input, and an output, wherein the first input is connected to the output of the input unit, the second input is configured to receive the target clock signal, the output generates a second intermediate signal, synchronized to the target clock signal, using the first intermediate signal; and a second synchronizer unit having first input, a second input, and an output, wherein the first input is connected to the output of the first synchronizer unit, the second input is configured to receive a source clock signal from the source clock domain, the output is connected to the third input of the input unit, and wherein the second synchronizer generates the clear signal in response to the second intermediate signal and the source clock signal.

2. The apparatus of claim 1, wherein the input unit comprises:

a D flip-flop having a data input, a clock input, and a complement output, wherein the complement output generates a signal that is complimentary to a signal applied to the data input and wherein the clock input is connected to the source clock signal;

a NAND gate having a first input, a second input, and an output, wherein the first input is configured to receive the input event signal, the second input is connected to the complementary output, and the output generates the first intermediate signal;

an AND gate having a first input, a second input, and an output, wherein the first input is connected to the output of the NAND gate, and the output is connected to the data input of the D flip-flop; and an inverter having an output and an input, wherein the input is connected to the clear signal and the output is connected to the second input of the AND gate.

3. The apparatus of claim 2, wherein the first synchronizer unit comprises:

a first D flip-flop having a data input, a clock input and an output, wherein the data input is connected to the first input of the first synchronizer, and the clock input connected to the second input of the first synchronizer unit; and a second D flip-flop having a data input, a clock input, and an output, wherein the data input is connected to the output of the first D flip-flop, the clock input is connected to the second input of the first synchronizer, the output is connected to the output of the first synchronizer unit.

4. The apparatus of claim 3, wherein the second synchronizer unit comprises:

a first D flip-flop having a data input, a clock input and an output, wherein the data input is connected to the first input of the second synchronizer, and the clock input connected to the second input of the second synchronizer unit; and a second D flip-flop having a data input, a clock input, and an output, wherein the data input is connected to the output of the first D flip-flop, the clock input is connected to the second input of the second synchronizer, the output is connected to the output of the second synchronizer unit.

5. The apparatus of claim 1 further comprising:

an output unit having a first input, a second input, and an output, wherein the first input is connected to the output of the first synchronizer unit, the second input is configured to receive the target clock signal, and the output generates an output event signal in response to the second intermediate signal and the target clock signal, the output event signal having a duration equal to a period of a single target clock signal.

6. The apparatus of claim 5, wherein the input unit comprises:

a D flip-flop having a data input, a clock input, and a complement output, wherein the complement output generates a signal that is complimentary to a signal applied to the data input and wherein the clock input is connected to the target clock signal;

a NAND gate having a first input, a second input, and an output, wherein the first input is configured to receive the input event signal and the second input is connected to the complementary output, and the output generates the first intermediate signal;

an AND gate having a first input, a second input, and an output, wherein the first input is connected to the output of the NAND gate, and the output is connected to the data input of the D flip-flop; and an inverter having an output and an input, wherein the input is connected to the clear signal and the output is connected to the second input of the AND gate.

7. The apparatus of claim 6, wherein the first synchronizer unit comprises:

a first D flip-flop having a data input, a clock input and an output, wherein the data input is connected to the first input of the first synchronizer, and the clock input connected to the second input of the first synchronizer unit; and second D flip-flop having a data input, a clock input, and an output, wherein the data input is connected to the output of the first D flip-flop, the clock input is connected to the second input of the first synchronizer, the output is connected to the output of the first synchronizer unit.

8. The apparatus of claim 7, wherein the second synchronizer unit comprises:

a first D flip-flop having a data input, a clock input and an output, wherein the data input is connected to the first input of the second synchronizer, and the clock input connected to the second input of the second synchronizer unit; and a second D flip-flop having a data input, a clock input, and an output, wherein the data input is connected to the output of the first D flip-flop, the clock input is connected to the second input of the second synchronizer, the output is connected to the output of the second synchronizer unit.

9. The apparatus of claim 8, wherein the output unit comprises:
- a D flip-flop having a data input, a clock input, and a complimentary output, in which the complimentary output generates a signal complimentary to the signal applied to the data input, wherein the data input is connected to the first input of the output unit and the clock input is connected to the second input of the output unit;
- a NAND gate having a first input, a second input, and an output, wherein the first input is connected to the first input of the output unit, the second input is connected to the complimentary output of the D flip-flop, and the output is connected to the output of the output unit.

10. An circuit for synchronously transferring signal pulses between a first clock domain and a second clock domain, the circuit comprising:
- an input means configured to receive a signal pulse and a first clock signal from the first clock domain, wherein an output signal is generated at an output in response to receiving the signal pulse until a clear signal is received at an input to the input means;
- a first synchronizer means for generating an intermediate signal, wherein the intermediate signal is generated by the synchronizer means using the output signal and a second clock signal from the second clock domain, and the intermediate signal is synchronized to the second clock signal;
- a second synchronizer means for generating the clear signal, wherein the second synchronizer means generates the clear signal using the intermediate signal and the first clock signal; and
- an output means for generating a transferred output signal using the intermediate signal and the second clock signal.

11. The circuit of claim 10, wherein the input means includes:
- a D flip-flop having a data input, a clock input, and a complement output, wherein the complement output generates a signal that is complimentary to a signal applied to the data input and wherein the clock input is connected to the source clock signal;
- a NAND gate having a first input, a second input, and an output, wherein the first input is configured to receive the input event signal, the second input is connected to the complementary output, and the output generates the first intermediate signal;
- an AND gate having a first input, a second input, and an output, wherein the first input is connected to the output of the NAND gate, and the output is connected to the data input of the D flip-flop; and
- an inverter having an output and an input, wherein the input is connected to the clear signal and the output is connected to the second input of the AND gate.

12. The circuit of claim 11, wherein the first synchronizer means includes:
- a first D flip-flop having a data input, a clock input and an output, wherein the data input is connected to the first input of the first synchronizer, and the clock input connected to the second input of the first synchronizer unit; and
- a second D flip-flop having a data input, a clock input, and an output, wherein the data input is connected to the output of the first D flip-flop, the clock input is connected to the second input of the first synchronizer, the output is connected to the output of the first synchronizer unit.

13. The circuit of claim 12, wherein the second synchronizer means includes:
- a first D flip-flop having a data input, a clock input and an output, wherein the data input is connected to the first input of the second synchronizer, and the clock input connected to the second input of the second synchronizer unit; and
- a second D flip-flop having a data input, a clock input, and an output, wherein the data input is connected to the output of the first D flip-flop, the clock input is connected to the second input of the second synchronizer, the output is connected to the output of the second synchronizer unit.

14. The circuit of claim 10 further comprising: an output unit having a first input, a second input, and an output, wherein the first input is connected to the output of the first synchronizer unit, the second input is configured to receive the target clock signal, and the output generates an output event signal in response to the second intermediate signal and the target clock signal, the output event signal having a duration equal to a period of a single target clock signal.

15. A data processing system comprising:
- a first circuit operating in a first clock domain;
- a second circuit operating in a second clock domain; and
- a synchronizer circuit connecting the first circuit to the second circuit, synchronizer circuit includes:
  - an input unit having a first input, a second input, a third input, and an output, wherein the first input is configured to receive the input event, the second input is configured to receive a source clock signal from the source clock domain, the third input is configured to receive a clear signal, and the output generates a first intermediate signal, the first intermediate signal being present at the output until the clear signal is received at the third input;
  - a first synchronizer unit having a first input, a second input, and an output, wherein the first input is connected to the output of the input unit, the second input is configured to receive the target clock signal, the output generates a second intermediate signal, synchronized to the target clock signal, using the first intermediate signal; and
  - a second synchronizer unit having first input, a second input, and an output, wherein the first input is connected to the output of the first synchronizer unit, the second input is configured to receive a source clock signal from the source clock domain, the output is connected to the [second] third input of the input unit, and wherein the second synchronizer generates the clear signal in response to the second intermediate signal and the source clock signal.

16. The data processing system of claim 15, wherein the input unit comprises:
- a D flip-flop having a data input, a clock input, and a complement output, wherein the complement output generates a signal that is complimentary to a signal applied to the data input and wherein the clock input is connected to the source clock signal;

a NAND gate having a first input, a second input, and an output, wherein the first input is configured to receive the input event signal, the second input is connected to the complementary output, and the output generates the first intermediate signal;

an AND gate having a first input, a second input, and an output, wherein the first input is connected to the output of the NAND gate, and the output is connected to the data input of the D flip-flop; and an inverter having an output and an input, wherein the input is connected to the clear signal and the output is connected to the second input of the AND gate.

17. The data processing system of claim 16, wherein the first synchronizer unit comprises:

a first D flip-flop having a data input, a clock input and an output, wherein the data input is connected to the first input of the first synchronizer, and the clock input connected to the second input of the first synchronizer unit; and a second D flip-flop having a data input, a clock input, and an output, wherein the data input is connected to the output of the first D flip-flop, the clock input is connected to the second input of the first synchronizer, the output is connected to the output of the first synchronizer unit.

18. The data processing system of claim 17, wherein the second synchronizer unit comprises:

a first D flip-flop having a data input, a clock input and an output, wherein the data input is connected to the first input of the second synchronizer, and the clock input connected to the second input of the second synchronizer unit; and a second D flip-flop having a data input, a clock input, and an output, wherein the data input is connected to the output of the first D flip-flop, the clock input is connected to the second input of the second synchronizer, the output is connected to the output of the second synchronizer unit.

19. The data processing system of claim 18 further comprising an output unit having a first input, a second input, and an output, wherein the first input is connected to the output of the first synchronizer unit, the second input is configured to receive the target clock signal, and the output generates an output event signal in response to the second intermediate signal and the target clock signal, the output event signal having a duration equal to a period of a single target clock signal.

20. A method for transferring data from a source clock domain to a target clock domain, the method comprising:

capturing an input signal from a source clock domain;

generating a first signal indicating that the input signal is to be transferred to the target clock domain;

synchronizing the first signal to a target clock for the target clock domain;

generating a second signal in response to synchronizing the first signal to the target clock;

synchronizing the second signal to a source clock for the source clock domain; and generating a clear signal in response to synchronizing the second signal to the source clock.

21. The method of claim 20, wherein the input signal is captured in an input unit.

22. The method of claim 21, wherein the step of generating the first signal occurs within the input unit.

23. The method of claim 22, wherein the step of synchronizing the first signal occurs in a first synchronizer unit having an input connected to the input unit, wherein the input receives the first signal.

24. The method of claim 23, wherein the step of generating a second signal is performed by the first synchronizer unit.

25. The method of claim 24, wherein the step of synchronizing the second signal occurs in a second synchronizer unit having an input connected to the first synchronizer unit, wherein the input receives the first signal.

26. The method of claim 25 further comprising:

clearing the capture of the input signal in response to generating the clear signal.

27. The method of claim 26, wherein the step of generating a clear signal occurs in the second synchronizer unit.

28. A synchronization circuit comprising:

an input unit;

a first synchronizer;

a second synchronizer; and an output unit having a plurality of modes of operation including:

a first mode of operation in which the input unit captures an input event originating from a first clock domain and asserts a first request signal indicating that the input event is to be transferred to a second clock domain;

a second mode of operation, responsive to capturing the input signal, in which the first synchronizer synchronizes the request signal to a clock signal for the second clock domain and asserts a second request signal; and a third mode of operation, responsive to generation of the second request signal, in which the output unit generates an output signal.

29. The synchronization circuit of claim 28 further comprising a fourth mode of operation, responsive to generation of the second request signal, in which the input unit clears the input signal.

30. The synchronization circuit of claim 28 further comprising a fifth mode of operation, responsive to generation of the second request signal, in which the first signal is deasserted by the input unit.

31. The synchronization circuit of claim 30 further comprising a sixth mode of operation, responsive to deassertion of the first signal, in which the second signal and the clear signal are deasserted.

* * * * *